United States Patent Office    3,649,662
Patented Mar. 14, 1972

3,649,662
PROCESS FOR THE PRODUCTION OF TRI-ORGANOLEAD COMPOUNDS AND COMPOUNDS AND MIXTURES FORMED THEREBY
Hermann Otto Wirth, Bensheim-Auerbach, Rudolf Maul, Bensheim, Bergstrasse, Hans-Helmut Friedrich, Lindenfels, Odenwald, and Wilhelm Hess, Darmstadt, Germany, assignors to Deutsche Advance Produktion GmbH, Lautern am Odenwald, Germany
No Drawing. Filed Apr. 29, 1969, Ser. No. 820,342
Claims priority, application Germany, May 10, 1968, P 17 68 409.2; Sept. 28, 1968, P 17 93 520.5; Feb. 26, 1969, P 19 09 494.1
Int. Cl. C07f 7/24
U.S. Cl. 260—437 R    20 Claims

ABSTRACT OF THE DISCLOSURE

Process for producing triorganolead compounds such as triorganolead acylates, inorganic acid salts, cyanides, halides, hydroxides, organic sulfonates, triazolides, imidazolides, carbamates, organic mercaptides, thiocarbamates, thiocarboxylates, phenolates, thiophenolates, substituted acylates, etc., including mono-triorganolead and bis(triorganolead) compounds, by reacting hexaorganodilead compounds with an organic acid, an inorganic acid, a sulfonic acid, organic mercaptans, inorganic cyanides, phenols, thiocarboxylic acid esters, organic amines, organic amides, inorganic hydroxides, inorganic acid salts, etc., in the presence of a percarboxylic acid. The process also results in novel mono-triorganolead compounds and novel bis(triorganolead) compounds as well as novel mixtures of such compounds.

The resulting compounds are useful as biocides, as retarding additives for lubricants, repellents against wild animals and rodents to protect crops or vegetation and as intermediates and catalysts for the production of useful chemical materials.

BACKGROUND OF THE INVENTION

(a) Field of the invention

The invention concerns certain new triorganolead compounds and mixtures thereof and an easy, efficient and generally usable process for the production of triorganolead compounds in general. The novel process involves the cleavage of hexaorganodilead compounds by the reaction of a percarboxylic acid and reaction with a suitable organic or inorganic compound to provide the desired triorganolead compound.

Triorganolead compounds are effective biocides. Various such compounds are also useful as wear retarding additives in lubricants and/or as deterents or repellants against damage to crops or vegetation by wild animals or rodents.

(b) Description of the prior art

In the production of certain triorganolead acylates, it has been known to subject certain easily accessible hexaorganodilead compounds to an oxidative cleaving by means of ozone or permanganate. As intermediates, one will obtain certain triorganolead oxides or hydroxides which are reacted then with corresponding acids to the desired triorganolead salts. The cleavage with the above mentioned oxidation agents, however, is fairly expensive and cumbersome.

Furthermore, it has been known to split specific hexaorganodilead compounds with hypochlorous acid (HOCl) or else with elementary chlorine at low temperatures. These processes, however, merely lead to certain triorganolead-chlorides for which there is only little technical interest and which are still fairly unstable in the aliphatic series.

The conversion of these chorides into the corresponding acylates is circumstantial and complicated.

For the production of certain trialkyllead acetates, it has been known to react specific hexaalkyldilead compounds with a mixture of hydrogen peroxide and glacial acetic acid. This process, however, has the disadvantage of having long reaction times and poor yields. For the production of triaryllead acetates this process cannot be used at all.

The production of heretofore known trialkyllead compounds hitherto had been accomplished almost exclusively via the bis(triorganolead) oxides or bis(triorganolead) hydroxides obtained from the corresponding hexaorganodilead compounds through oxidative cleavage by means of ozone or permanganate. The other known processes, however, only have academic interest and are not usable for commercial production.

In the butyl series, the following examples can be taken from the literature: tri-n-butyllead-p-toluene sulfonate,[1] tri-n-butyllead-1,2,3,-benztriazolide,[2] tri-n-butyllead-imidazolide. The production of tri-n-butyllead hydroxide has been described in.[3]

In the case of triphenyllead compounds, the most important processes likewise are dependent upon the conversion of triphenyllead hydroxides with corresponding acids, mercaptans or amines. The obtention of the triphenyllead hydroxide or bis-triphenyllead oxide is quite expensive and cumbersome.[4] The following examples can be taken from the literature: triphenyllead-ethyl mercaptide,[5] triphenyllead-thiophenolate,[6] triphenyllead-imidazolide,[6] triphenyllead-1,2,3-benzimidazolide,[6] triphenyllead-3-amino-1,2,4-triazolide,[6] triphenyllead chloride.[7]

The following conversion is also known for the production of triphenyllead fluoride:

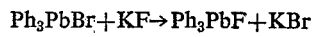
$$Ph_3PbBr + KF \rightarrow Ph_3PbF + KBr$$

Since, however, the triphenyllead brodide is accessible only with difficulty, this reaction has no practical significance. The same is true for the production of triphenyllead cyanide [8] known in accordance with the following reaction equation:

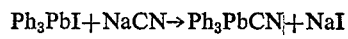
$$Ph_3PbI + NaCN \rightarrow Ph_3PbCN + NaI$$

Finally, there is still one production method for triphenyllead mercaptide to be mentioned, for which the following reaction formula is valid [8]:

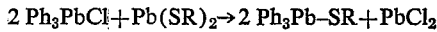
$$2\ Ph_3PbCl + Pb(SR)_2 \rightarrow 2\ Ph_3Pb-SR + PbCl_2$$

This process can attain no practical significance because of its unwieldiness. Hitherto there did not exist a simple production process that could be used for all types of triorganolead compounds.

It is, therefore, an object of this invention to create a generally usable process for the production of triorganolead compounds, which is simple and which can be carried out with relatively low costs and which leads to good yields.

Salts having the tri-n-butyllead cation are excellent biocides, as mentioned above. However, compounds of this type, such as tri-n-butyllead acetate, tri-n-butyllead lau- ---
[1] M. Dub, "Organometallic Compounds, Methods of Synthesis, Physical Constants and Chemical Reactions," vol. II, Springer Publishers, 1967, p. 565.
[2] L. C. Williamsens and G. J. M. van der Kerk, "Investigations in the Field of Organolead Chemistry," Schotanus & Jens, Utrecht, 1965, p. 70.
[3] Cf. No. 2, p. 66.
[4] Cf. No. 2, pp. 72, 73.
[5] Cf. No. 1, p. 585.
[6] Cf. No. 2, pp. 69, 70.
[7] Cf. No. 1, p. 554.
[8] Cf. footnote 1, p. 585 of cited publication; cf. U.S. Patent 3,322,779 (May 30, 1967).

rate, tri-n-butyllead chloride and so forth, are without exception well to very well soluble in organic (homopolar) solvents. This is a disadvantage both in production and in handling during practical use. At the same time one must also note, to be sure, that these lead compounds are strong poisons. A further essential disadvantage of these tri-n-butyllead salts is their imperfect chemical stability, which is particularly pronounced in the case of the chloride.

It is also an object of this invention to find a tri-n-butyl lead salt which has as slight as possible a solubility in organic (homopolar) solvents and which excels in a high degree of chemical stability. It has been found that the bis-(tri-n-butyllead)-sulfate fulfills these requirements.

SUMMARY OF THE INVENTION

The present invention provides a generally usable process for the production of triorganolead compounds including mixtures thereof using simple procedures at relatively low costs and technical expenditures and resulting in high yields. The present invention also provides novel triorganolead compounds and novel mixtures thereof.

It has been found that the principle of the cleavage of hexaorganodilead compounds by means of a percarboxylic acid can be used generally for the production of a wide variety of triorganolead compounds. According to the invention, for example, triorganolead salts of organic acids, triorganolead sulfonates, triorganolead mercaptides, triorganolead amides, triorganolead cyanides and triorganolead hydroxides can be produced. In one aspect, for example, triorganolead acylates or mixtures thereof and triorganolead salts of other anions (inorganic or organic) are produced through cleavage of the corresponding hexaorganodilead compound, whereby about 1 mole of percarboxylic acid is used for the cleavage per mole of hexaorganodilead compound and about one additional mole of an acid (organic or inorganic) is added for the complete conversion. In another aspect, about two additional moles of an acid or other active hydrogen compound or their equivalent alkali metal or alkaline earth metal compound, is used in place of the one additional mole of an acid to complete the conversion.

The process of the present invention produces triorgano lead compounds of the formula:

$$[R_3Pb]_nX_m$$

wherein R is selected from the group consisting of (1) phenyl radicals or naphthyl radicals, which can be substituted with substituents from the class consisting of alkyl and alkoxy radicals having 1 to 6 carbon atom, fluorine and chlorine; (2) linear and branched alkyl radicals having 1 to 12 carbon atoms; (3) cycloalkyl radicals having 3 to 18 carbon atoms, preferably 6 to 12 carbon atoms, such as cyclopentyl or cyclohexyl, and aralkyl radicals having 7 to 18 carbon atoms, preferably 7 to 12 carbon atoms, $n$ and $m$ are each an integer of 1 to 2. X is selected from the class consisting of anions of organic and inorganic acids, the radicals of organic amines, remaining after removal of the active hydrogen bonded to nitrogen, the radicals of organic mercaptans remaining after removal of the active hydrogen bonded to sulfur, —OH and —CN. In the novel process, the corresponding hexaorganodilead compound, $R_3Pb—PbR_3$, wherein R is defined above, is cleaved by an equimolar quantity of a percarboxylic acid.

Percarboxylic acids suitable for use in the novel process, especially in the aspect of the invention first mentioned above include those having the formula:

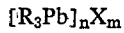

wherein R' is selected from the class consisting of (1) phenyl radicals which can be substituted with substituents from the class consisting of alkyl radical having 1 to 6 C atoms, alkoxy radicals having 1 to 6 C atoms, carboxyl radicals, fluorine and chlorine; (2) linear and branched, saturated and unsaturated hydrocarbon radicals having 1 to 18 carbon atoms, which can be substituted with a substituent from the class consisting of fluorine, chlorine, bromine and carboxyl groups; (3) cycloalkyl radicals having 3 to 12 C atoms, such as cyclopentyl and cyclohexyl; and (4) aralkyl radicals having 7 to 12 C atoms. Examples of percarboxylic acids suitable for use in the process of this invention are peracetic acid, monochloroperacetic acid, trifluoroperacetic acid, phenylperacetic acid, perbutyric acid, percaprylic acid, perlauric acid, perpalmitic acid, per-2-ethyl-hexanoic acid, permaleic acid, perbenzoic acid, monoperphthalic acid, and the like. Any of the above-described percarboxylic acids are suitable for use in both aspects of the invention mentioned above, although peracetic acid is preferred for the second-mentioned aspect.

The acid or other active hydrogen compound used in addition to the percarboxylic acid is represented by the formula $H_nX_m$ wherein X is as defined above, $n$ is an integer of 1 to 2 and $m$ is an integer of 1 to 2. The equivalent alkali metal or alkaline earth metal compound $M_nX_m$, wherein X, $n$ and $m$ are as defined above and M is alkali metal, e.g., sodium, potassium, etc., or alkaline earth metal, e.g., calcium, barium, etc. The acid, active hydrogen compound and equivalent compounds can be represented by the overall formula $R°_nX_m$ wherein $R°$ is hydrogen, alkali metal or alkaline earth metal as described above and X, $n$ and $m$ are as described above. As the $R°_nX_m$ reactant, one can utilize carboxylic acids, e.g., alkanoic acids having 2 to 18 carbon atoms and aromatic hydrocarbon carboxylic acids having 7 to 18 carbon atoms, mineral acids, sulfonic acids or acids of a phenolic nature. Generally speaking, it will be advantageous to use these acids in a diluted state. The addition of the such acids is accomplished advantageously in mixture with the percarboxylic acid.

For the production of biocides the following acids, for example, have proven to be advantageous: trichloro acetic acid, trifluoro acetic acid, p-toluene sulfonic acid, dinitrophenol, pentachlorophenol, hydrofluoric acid, tetrafluoro boric acid, hexafluoro silicic acid and the like. Other acids include hydrochloric acid, perchloric acid, sulfuric acid, nitric acid, methane sulfonic acid, benzene sulfonic acid, amino sulfonic acid, 2-hydroxyethane sulfonic acid, 3-hydroxypropane sulfonic acid, sorbic acid, terephthalic acid, caprylic acid, lauric acid, hydrocyanic acid, hydroiodic acid, benzoic acid, phthalic acid, maleic acid, 2-ethylhexanoic acid, acetic acid, and the like. Alkali metal and alkaline earth metal salts of these acids can be used, for example, the potassium and sodium salts of each of the above-listed acids. Water, alkali metal hydroxides and alkaline earth metal hydroxides can also be used.

The $R°_nX_m$ compounds also include the organic mercaptans preferably containing 1 to 18 carbon atoms and include alkyl mercaptans, such as the methyl, ethyl, hexyl, lauryl, stearyl, and 2-ethylhexyl mercaptans, the thiophenols, such as thiophenol, thiocresol, thiobiphenyls and the like, thiocarboxylic acid esters such as thioglycolic acid esters, e.g., ethyl thioglycolate, lauryl thioglycolate, stearyl thioglycolate and the like, and thiopropionic acid esters, e.g., ethyl thiopropionate, lauryl thiopropionate, stearyl thiopropionate and the like; N,N-dialkyldithiocarbamates of alkali metals and alkaline earth metals, such as sodium N,N-dimethyldithiocarbamates, potassium N,N-dilauryldithiocarbamate, sodium N,N-diesteraryldithiocarbamate and the like; organic amines, preferably secondary amines, such as imidazole, benztriazole, benzimidazole, aminotriazole and the like; organic amides such as amides of the above-mentioned organic acids, phthalimide, succinimide, acetamide and the like. Alkali metal salts and alkaline earth metal salt of the above-listed compounds can also be used as substitutes.

For the reaction, the percarboxylic acid, if desired dissolved in a solvent, is permitted to act upon the hexaorganodilead compound which is advantageously dissolved in a solvent. In the case of low solubility, one can also use a suspension or a solution with dispersion. The solvents must be sufficiently inert toward the percarboxylic acid and, besides, they must have at least a low capacity for dissolving both the hexaorganodilead compound to be reacted as well as the percarboxylic acid. One can also use monophase mixtures of nonmiscible solvents.

Suitable solvents are, for example: aromatic hydrocarbons, such as benzene, toluene, xylene, chlorobenzene, dichlorobenzene and the like; aliphatic hydrocarbons, such as hexane, cyclohexane, carbon tetrachloride, chloroform, methylene chloride, trichloroethylene and the like; ethers, such as diethyl ether, dibutyl ether, dioxane, tetrahydrofurane, anisol and the like; alcohols, such as ethanol, butanol, isopropanol and the like; ketones, such as acetone and methylethyl ketone and the like.

One can also operate the process in the presence of water, for example, for the dilution of the percarboxylic acid or in the case of alkali metal or alkaline earth metal compounds $M_nX_m$.

The process is characterized by the fact that one carries out the cleavage in the presence of the $M_nX_m$ compound (bearing the radical desired as a substituent X) in an acid environment whereby one to two moles of the compound are used per mole of hexaorganodilead compound.

If the $M_nX_m$ compound is not inert with respect to the percarboxylic acid used, then the process will be changed to the extent, that both cleaved pieces of hexaorganodilead compound are first converted to a triorganolead acylate through the addition of a carboxylic acid (to replace or supplement that resulting from the decomposition of the percarboxylic acid) and then the $M_nX_m$ compound reacts with such acylate for the further conversion without isolation of the lead acylate intermediate compound. In principle, the cleavage can be accomplished with any percarboxylic acid, though peracetic acid is preferred.

The addition of the percarboxylic acid, preferably, if possible, as a mixture with the compound which carries the substituent X, is accomplished effectively while stirring and cooling the reaction medium (solution or suspension) containing the hexaorganodilead compound. One can also first mix the compound carrying the substituent X with the hexaorganodilead compound and then add the percarboxylic acid. In both cases it will be effective to heat briefly after the addition of the percarboxylic acid in order to complete the conversion. If the X containing compound and/or percarboxylic acid are added as aqueous solutions and if the solvent for the hexaorganodilead compound is not miscible with water, then the resulting two phase system must be well stirred.

In the case of the use of peracetic acid and $R°X$ (i.e., where $n$ and $m$ are both $(1)$), the conversion takes place in accordance with the following equation:

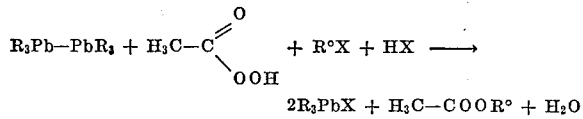

$$2R_3PbX + H_3C-COOR° + H_2O$$

Therefore, one mole of percarboxylic acid and two moles of the compound HX (one mole of which, if desired could be the carboxylic acid formed in situ by decomposition of the percarboxylic acid) or one mole HX and one mole MX are required per mole of hexaorganodilead compound. The cleavage reaction takes place only under acid conditions, most favorably in a slightly acid environment, since in the latter case side reactions are suppressed. If the compound $R°X$ is used in the form of their salts, i.e., MX, then one must use an aliquot part of a free acid, preferably in the form of acetic acid.

Determination of the uniform course of the reaction is the different strength between, on the one hand, the triorganolead radical and the acetate or acylate anion from the percarboxylic acid and, on the other hand, between the triorganolead radical and the anion X desired as the substituent on lead. The acylate bond is relatively weak and if sufficient anions X are available, then only the desired triorganolead compound is formed. Therefore, the course of the reaction favors the formation of $R_3PbX$ whenever the anion X has a higher affinity for the triorganolead radical than the acylate ion of the percarboxylic acid used. Besides that, differences in the solubility can also influence the conversion. Generally, the development of the compound is favored which has the lesser solubility in the reaction medium. There are, however, a few exceptions. For example, the conversion of hexaphenyldilead in tetrahydrofurane takes place, for instance, in favor of the chloride, although the acetate is considerably more difficult to dissolve in this solvent.

In the case of the conversion of carboxylic acids as the $R°_nX_m$ compound, there are no noteworthy differences in the binding strength of the acylate ions to the triorganolead radicals. Therefore, in these cases, the course of the reaction is quite essentially determined by the differences in solubility.

For the obtention of triorganolead acylates, therefore, one can control the desired direction of the reaction through a suitable selection of the solvent serving as a reaction medium. For example, in the case of the cleavage of hexaphenyldilead by means of peracetic acid in the presence of sorbic acid and in the case of the use of petroleum ether as a solvent, the sorbate develops exclusively, since the latter is more difficultly soluble than the acetate.

A few examples of anions X, usable in accordance with the invention, which can be used in the form of the free acid or the corresponding salt, are: fluoride, chloride, perchlorate, tetrafluoroborate, hexafluorosilicate, sulfate, nitrate; methane sulfonate, p-toluene sulfonate, benzene sulfonate, amido sulfonate, 2-hydroxyethane sulfonate, 3-hydroxypropane sulfonate anions.

As described in more detail in the embodiments presented by way of examples, the following triorganolead compounds were produced, of which the one designated with an asterisk have not yet been described in the literature: triphenyl lead fluoride, triphenyl lead chloride, bis-(triphenyl lead)-hexafluorosilicate*, triphenyl lead-tetrafluoroborate*, bis-(triphenyl lead)-sulfate*, triphenyl lead-tetrafluoro-borate*, bis(triphenyl lead)-sulphate*, triphenyl lead sorbate*, tri-n-butyl lead fluoride, bis(tri-n-butyl lead)-sulfate*, triphenyl lead-methane sulfonate*, triphenyl lead-p-toluene sulfonate*, triphenyl lead-amido sulfonate*, tributyl lead-amido sulfonate*, tributyl lead-p-toluene sulfonate*, bis-(tri-n-butyl lead)-terephthalate and the like.

As mentioned above, the compounds $R°_nX_m$, which as regards the peracids, e.g., peracetic acid, are not inert, can also be converted according to the invention into the corresponding triorganolead compounds. This is true, above all, for mercaptans. In these cases, the hexaorganolead compound should first of all be completely converted into the triorganolead acylate. Without isolation of this intermediate, the further conversion to the desired triorganolead compound can then immediately follow. Therefore, no additional processing step is required. In the case of this method of operation, an excess of percarboxylic acid is to be avoided.

A few examples of compounds $R°_nX_m$ which can be converted in this manner are: alkyl mercaptans, such as methyl, ethyl, hexyl, lauryl, stearyl and 2-ethylhexyl mercaptans; thiophenols, such as thiophenol, thiocresol, thiobiphenyls; thiocarboxylic acid esters, such as thioglycol acid ester, thiopropionic acid ester; dialkyldithiocarbamates of the alkali metals and alkaline earth metals, hydrobromic acid or bromides of the alkali metals and alkaline earth metals, hydriodic acid or iodides of the alkali metals and alkaline earth metals, and hydrocyanic acid or cyanides of the alkali metals and alkaline earth metals.

As described in more detail in the embodiments presented by way of examples, the following triorganolead compounds were produced from such compounds, of which the ones designated with an asterisk are new: triphenyl lead-ethyl mercaptide, triphenyl lead-hexyl mercaptide*, triphenyl lead-lauryl mercaptides*, triphenyl lead-thiophenolate, triphenyl lead-thioglycol acid-i-octyl ester*, triphenyl lead-thiopropionic acid-i-octyl ester*, and triphenyl lead-diethyldithiocarbamate*.

As mentioned above, an acid environment is required for the cleavage of the lead to lead bond of the hexaorganodilead compound. However, there are $R°_nX_m$ compounds, e.g., amides, which are not stable in an acid environment or which do not react with the triorganolead cation or whose corresponding triorganolead compounds are not stable in the acid environment. In those cases too, according to the invention, one will first convert completely to the acylate with percarboxylic acid. Subsequently, the mixture is treated with sodium carbonate and at the same time or immediately afterwards, the addition of the $R°_nX_m$ compound can take place. If one converts the reaction mixture after the formation of the acylate with sodium hydroxide, potassium hydroxide or calcium hydroxide directly, then one obtains the triorganolead hydroxides. This way is particularly interesting for the obtention of triphenyllead hydroxide. Examples for $R°_nX_m$ compounds that can be converted in the just described manner are: amines, preferably secondary amines, such as imidazole, benztriazole, benzimidazole and aminotriazole; amides, such as phthalimide, succinimide, and acetamide; and hydroxides of the alkali metals and alkaline earth metals.

As described in more detail in the embodiments presented by way of examples, the following triorganolead compounds were produced from such compounds: triphenyl lead-imidazolide, triphenyl lead-benzimidazolide, triphenyl lead-benztriazolide, triphenyl lead-3-amino-1,2,4-benztriazolide, tributyl lead-imidazolide, tributyl lead-benzimidazolide, tributyl lead-3-amino-1,2,4-benztriazolide, tributyl lead-benztriazolide and triphenyl lead-benztriazolide and triphenyl lead-hydroxide.

Where it is desired, the carboxylic acid resulting on a mole to mole basis from the decomposition of the percarboxylic acid can be utilized as a part of the $R°_nX_m$ compound, in which event only one additional mole of $R°_nX_m$ compound need be added, the second mol being formed in situ by decomposition of the percarboxylic acid. One molecule of percarboxylic acid is required for the cleavage of one molecule of hexaorganodilead compound. In this case the percarboxylic acid is converted to the corresponding carboxylic acid and the latter immediately continues to react while forming the acylate. For the complete conversion of one molecule of hexaorganodilead compound into two molecules of triorganolead salt, it will therefore be necessary to add still a second molecule or a further acid. If one uses carboxylic acid corresponding to the percarboxylic acid as a further acid, then one will arrive at a uniform product. If, on the other hand, one uses another acid, then a mixture of triorganolead salts will develop which can be of advantage in practical application in chemical engineering.

According to this aspect of the invention, the acids must be added in equimolar quantities or with only a small excess. An excess of acid may lead to diorganolead diacylates, which is particularly favored in the case of aryl lead compounds, so that one will obtain preponderantly diaryl lead diacylates.

In the case of certain percarboxylic acids, e.g., in the case of peracetic acid, the mole ratio of percarboxylic acid to the added acid ($R°_nX_m$) can be smaller than 1. Such an acid mixture can, however, also be adduced for the oxidative cleavage even of hexaaryldilead compounds to triarylead solutions, despite the above-mentioned side reaction, whenever proper precautions have been taken. For one thing, this can be accomplished by selecting a solvent as the reaction medium in which the triaryllead salt is largely insoluble; it is then precipitated and is removed from further attack by the acid. According to another variation of the process, a two-phase reaction medium is used which has a differing distribution coefficient for the percarboxylic acid and for the added acid ($R°_nX_m$). Practically any combination of the above-mentioned solvents with water is suitable for this purpose, insofar as the solvents themselves are not miscible with water and insofar as the percarboxylic acids as well as the added acid have a sufficient solubility in water. In principle, the percarboxylic acids are always more soluble in organic solvents than their corresponding carboxylic acids; the difference is remarkably great particularly in the case of a small organic residue [radical]. In the organic phase, which contains the hexaaryldilead in solution and which therefore represents the main reaction medium, the stationary concentration of percarboxylic acid therefore is always greater than that of carboxylic acid. If one simultaneously takes care of the fact, that the triaryllead salt formed is separated in crystalline form—which in most cases can be controlled through selection of the solvent—then one will also achieve excellent yields under these conditions. In the case of the cleavage of the hexaphenyldilead with a commercial peracetic acid (containing a mole ratio of peracid to acetic acid of 1:1.5), this was utilized successfully. Toluene served in this case as a reaction phase solvent.

According to this phase of the invention the following triorganolead acylates were produced, of which the ones designated with an asterisk are new compounds: triphenyl lead acetate, triphenyl lead benzoate, triphenyl lead caprylate*, triphenyl lead monophthalate*, tri-p-tolyl lead acetate, tri-p-tolyl lead-2-ethyl hexoate*, tributyl lead acetate, triphenyl lead laurate, triphenyl lead maleinate and the like.

Mixed salts from triorgano lead acylates and triorgano lead salts of other anions are also produced according to the process, e.g., triphenyl lead acetate/triphenyl lead trichloro acetate, triphenyl lead acetate/triphenyl lead trifluoro acetate, triphenyl lead acetate/triphenyl lead pentachloro phenolate, triphenyl lead acetate/triphenyl lead dinitro phenolate, triphenyl lead acetate/triphenyl lead hexafluoro silicate, triphenyl lead acetate/triphenyl lead toluene sulfonate, tributyl lead acetate/tributyl lead trichloro acetate, tributyl lead acetate/tributyl lead trifluoro acetate, tributyl lead acetate/tributyl lead hexafluoro silicate, tributyl lead acetate/tributyl lead toluene sulfonate and the like.

DESCRIPTION OF SPECIFIC EMBODIMENTS

The following examples are presented illustrating the preparation of but a few selected triorganolead compounds from the multitude of such compounds that can be produced by the processes of the present invention. All parts and percentages are by weight.

EXAMPLE 1

Tri-n-butyllead fluoride (a) 72 parts by weight of hexabutyldilead were dissolved in 200 parts by weight of toluene. Then, a solution of 14.4 parts by weight of a 50% aqueous solution of peracetic acid and 20 parts by weight of a 40% aqueous solution of hydrofluoric acid was added drop by drop while stirring at 25–30° C. under ice cooling. Stirring was continued at room temperature for 20 minutes afterwards, the solvent was distilled off in the vacuum and the residue was absorbed with 200 parts by weight of acetone. The undissolved reaction product was sucked off and dried.

Yield: 68 parts by weight (90% of theory)
Melting point: 212° C. (decomposition)
Pb Calculated: 52.15%. Found: 51.8%.

(b) When the peracetic acid was replaced by perbutyric acid, then the yield amounted to 93% of the theory.

EXAMPLE 2

Bis-(tri-n-butyllead) sulfate (a) 21.2 parts by weight of hexabutyldilead and 6.8 parts by weight of acid potassium sulfate were suspended in 100 parts by weight of acetone and then mixed while stirring with 6.9 parts by weight of a 55% aqueous solution of peracetic acid into 20 parts by weight of water, drop by drop, at room temperature. The mixture then was heated for 45 minutes under reflux, cooled down to 20° C. and then the reaction product was sucked off and dried.

Yield: 21.8 parts by weight (91% of theory)

After recrystallization from $CHCl_3$ the substance melted at 230° C. (decomposition).

Calculated (percent): Pb, 48.58; C, 33.88; H, 6.38; S, 3.50. Found (percent), Pb, 48.2; C, 34.25; H, 6.44; S, 3.76.

(b) When the acid potassium sulfate was replaced with diluted sulfuric acid, then a yield of 82% of the theory was obtained.

EXAMPLE 3

Bis-(tri-n-butyllead) terephthalate 7.6 parts by weight of hexabutyldilead and 1.7 parts by weight of terephthalic acid were suspended in 50 parts by weight of acetone and a solution of 1.4 parts by weight of a 55% aqueous solution of peracetic acid was added drop by drop at room temperature while stirring. Then, the mixture was heated for 60 minutes under reflux, cooled to 0° C. and the reaction product was sucked off and dried.

Yield: 8.2 parts by weight (75% of theory).
Melting point: 166–168° C.
Pb Calculated: 41.72%. Found: 41.5%.

EXAMPLE 4

Tri-n-butyllead-p-toluene sulfonate 7.6 parts by weight of hexabutyldilead were dissolved in 50 parts by weight of acetone and a solution of 1.4 parts by weight of a 55% aqueous solution of peracetic acid and 0.6 parts by weight of glacial acetic acid was added drop by drop at room temperature while stirring. Stirring was continued for 10 minutes and then 3.8 parts by weight of p-toluene sulfonic acid were added. The mixture was heated for 30 minutes at reflux and then reduced to dryness, after cooling under vacuum. The residue was recrystallized from acetonitrile.

Yield: 11 parts by weight (97% of theory)
Melting point: 79–81° C. (Found)
81–82° C.[1]

EXAMPLE 5

Tri-n-butyllead-benzotriazolide 7.6 parts by weight of hexabutyldilead were dissolved in 50 parts by weight of acetone and a solution of 1.4 parts by weight of a 55% aqueous solution of peracetic acid and 0.6 part by weight of glacial acetic acid was added at room temperature drop by drop while stirring. Stirring was continued for 10 minutes. After addition of 2.4 parts by weight of 1,2,3-benzotriazole and of a solution of 2.2 parts by weight of sodium carbonate in 10 parts by weight of water, the mixture was heated for 30 minutes under reflux, cooled down to 20° C., and then absorbed with 200 parts by weight of methylene chloride. The aqueous phase was separated and the organic phase was reduced in vacuum to dryness. The residue was recrystallized from acetonitrile.

Yield: 7.5 parts by weight (76% of theory)
Melting point: 96–97° C. (Found)
103° C.[2]

EXAMPLE 6

Tri-n-butyllead-imidazolide

With the same method of operation as in Example 5, 1.4 parts by weight of imidazole were used instead of the 1,2,3-benzotriazole.

Yield: 6.4 parts by weight (72% of theory)
Melting point: 47–49° C. (Found)
48–50° C.[2]

EXAMPLE 7

Triphenyllead-hydroxide (a) 44 parts by weight of hexaphenyldilead were suspended in 100 parts by weight of acetone and a solution of 6.9 parts by weight of a 55% aqueous solution of peracetic acid and 3 parts by weight of glacial acetic acid was added drop by drop at room temperature while stirring. Stirring was continued for 10 minutes and then a solution of 5 parts by weight of sodium hydroxide and 15 parts by weight of water was added. Subsequently, the mixture was heated for 20 minutes at reflux and cooled to 20° C. The precipitated reaction product was filtered off and dried.

Yield: 44 parts by weight (97% of theory)
Melting point: 238° C. (decomposition) (Found)
240° C. (decomposition).[9]

(b) When the sodium hydroxide was replaced by potassium hydroxide, there was obtained a yield of 95% of theory.

EXAMPLE 8

Triphenyllead fluoride (a) 219 parts by weight of hexaphenyldilead were suspended in 1250 parts by weight of methanol and a solution of 19.2 parts by weight of a 50% aqueous solution of peracetic acid, 37 parts by weight of a 40% aqueous solution of hydrofluoric acid and 250 parts by weight of water was added drop by drop at 30–40° C. while stirring. The mixture was heated for one hour under reflux, cooled to 20° C. and reaction product was then sucked off and dried.

Yield: 227 parts by weight (99% of theory)
Melting point: 315–320° C. (decomposition) (Found)
318° C.[10]

(b) Replacement of the peracetic acid by perpropionic acid led to a yield of 95% of theory.

EXAMPLE 9

Triphenyllead chloride 21.9 parts by weight of hexaphenyldilead and 6.5 parts by weight of concentrated hydrochloric acid were suspended in 100 parts by weight of ethanol. This mixture was mixed at 20° C. while stirring drop by drop with 3.5 parts by weight of a 55% aqueous solution peracetic acid. The mixture was then heated at reflux for 30 minutes and cooled to 20° C. The reaction product was sucked off and dried.

Yield: 23 parts by weight (97% of theory)
Melting point: 208° C. (Found)
205° C.[7]

EXAMPLE 10

Bis-(triphenyllead) sulfate 21.9 parts by weight of hexaphenyldilead and 6.9 parts by weight of acid potassium sulfate were suspended in 100 parts by weight of acetone. 3.5 parts by weight of a 55% aqueous solution of peracetic acid in 20 parts by weight of water were added drop by drop at 20° C. while

[9] Cf. footnote 1, p. 568 of cited publication.
[10] E. Krause and A. V. Grosse, "Chemistry of the Metall-organic Compounds," Edwards Bros., Inc.; Ann Arbor, Mich., 1943, pp. 417, 418.

stirring. The mixture then was heated at reflux for 30 minutes and then cooled to 20° C. The reaction product was sucked off and dried.

Yield: 23.9 parts by weight (100% of theory)
Melting point: >300° C.

Calculated (percent): Pb, 42.6; C, 44.44; H, 3.11.
Found (percent): Pb, 42.95; C, 43.97; H, 3.49.

EXAMPLE 11

Bis-(triphenyllead) hexafluorosilicate 44 parts by weight of hexaphenyldilead were suspended in 100 parts by weight of benzene and a solution of 6.9 parts by weight of a 55% aqueous solution of peracetic acid and 23 parts by weight of a 30% aqueous solution of hexafluoro silicic acid was added drop by drop at room temperature while stirring. After that, the mixture was under reflux for 2 hours and then cooled to 20° C. The reaction product was sucked off and dried.

Yield: 39 parts by weight (76% of theory)
Melting point: >320° C.
Pb, Calculated: 40.7%. Found: 39.9%.

EXAMPLE 12

Triphenyllead-tetrafluoroborate

With the same method as in Example 11, 8.7 parts by weight of fluoroboric acid was used instead of the hexafluorosilicic acid.

Yield: 42 parts by weight (80% of theory)
Melting point: 320–325° C. (decomposition)
Pb, Calculated: 39.34%. Found: 38.9%.

EXAMPLE 13

Triphenyllead cyanide

A solution of 6.9 parts by weight of a 55% aqueous solution of peracetic acid and 3 parts by weight of glacial acetic acid was added while stirring at room temperature to 44 parts by weight of hexaphenyldilead suspended in 100 parts by weight of acetone. Stirring was continued for 10 minutes and then a solution of 4.9 parts by weight of sodium cyanide and 50 parts by weight of water was added. Then the mixture was heated for 10 minutes at reflux and then cooled to 10° C. The reaction product was sucked off and dried.

Yield: 40 parts by weight (86% of theory)

A part was recrystallized from ethanol/chloroform.

Melting point: 278–280° C. (decomposition) (Found) 250° C. decomposition.[11]

The difference in relation to melting point rests very probably on the degree of purity.

Calculated (percent): Pb, 44.6; C, 49.12; H, 3.25; N, 3.74: Found (percent): Pb, 44.1; C, 49.46; H, 3.25; N, 3.02.

EXAMPLE 14

Triphenyllead-diethyldithiocarbamate

A solution of 6.9 parts by weight of a 55% aqueous solution of peracetic acid and 3 parts by weight of glacial acetic acid was added drop by drop at room temperature while stirring to 44 parts by weight of hexaphenyldilead suspended in 100 parts by weight of acetone. Stirring was continued for 10 minutes and then 22.5 parts by weight of Na-diethyl-dithiocarbamate was added. Then the mixture was at reflux for 2 hours. After cooling to 20° C., the reaction product was sucked off and was recrystallized from acetone.

Yield: 48 parts by weight (82% of theory) slightly yellow crystals
Melting point: 132° C.

[11] Cf. footnote 1, p. 563 of cited publication.

Calculated (percent): Pb, 35.3; C, 47.10; H, 4.30.
Found (percent): Pb, 34.9; C, 47.38; H, 4.40.

EXAMPLE 15

Triphenyllead-mercaptide of 2-ethylhexyl beta-mercaptopropionate 44 parts by weight of hexaphenyldilead were suspended in 100 parts by weight of acetone and a solution of 6.9 parts by weight of a 55% aqueous solution of peracetic acid and 3 parts by weight of glacial acetic acid was added at room temperature drop by drop while stirring. Stirring was continued for 10 minutes, then 17 parts by weight of isooctyl beta-mercaptopropionate and a solution of 15 parts by weight of sodium carbonate in 20 parts by weight of water were added. The mixture was heated for 10 minutes to 50° C. and then cooled to 20° C. The undissolved part was filtered off and the filtrate was reduced under vacuum.

Yield: 45 parts by weight (89% of theory) yellowish liquid
$n_D^{20}$: 1,600

Pb, Calculated: 31.5%. Found: 30.25%.

EXAMPLE 16

Triphenyllead-ethyl mercaptide 44 parts by weight of hexaphenyldilead were suspended in 100 parts by weight of acetone. Then a solution of 6.9 parts by weight of a 55% aqueous solution of peracetic acid and 3 parts by weight of glacial acetic acid was added drop by drop at room temperature. Stirring was continued for 10 minutes, then 6.2 parts by weight of ethyl mercaptan and the solution of 15 parts by weight of sodium carbonate in 20 parts by weight of water were added. The mixture was heated for 30 minutes at reflux and then cooled to 0° C. The undissolved material was filtered off and the filtrate was reduced under vacuum to dryness. The residue was recrystallized from ethanol.

Yield: 42 parts by weight (84% of theory)
Melting point: 68–69° C. (Found)
68° C.[5]

EXAMPLE 17

Triphenyllead-hexyl mercaptide 44 parts by weight of hexaphenyldilead were suspended in 100 parts by weight of acetone. Then a solution of 6.9 parts by weight of a 55% aqueous solution of peracetic acid and 3 parts by weight of glacial acetic acid was added drop by drop at room temperature. Stirring was continued for 10 minutes. Then 11.8 parts by weight of 1-hexane thiol and a solution of 15 parts by weight of sodium carbonate in 20 parts by weight of water were added. The mixture was heated for 10 minutes under reflux and the solvent was distilled off under vacuum from the clear colorless solution.

Yield: 48 parts by weight (86% of theory) of a colorless liquid
$n_D^{20}$: 1,625
Pb, Calculated: 37.3%. Found: 36.5%.

EXAMPLE 18

Triphenyllead-lauryl mercaptide 44 parts by weight of hexaphenyldilead were suspended in 100 parts by weight of acetone. Then a solution of 6.9 parts by weight of a 55% aqueous solution of peracetic acid and 3 parts by weight of glacial acetic acid was added drop by drop at room temperature. Stirring was continued for 10 minutes, then 20.2 parts by weight of lauryl mercaptan and the solution of 15 parts by weight of sodium carbonate in 20 parts by weight of water were added. The mixture was heated for 10 minutes on the reflux. The solvent was distilled off in vacuum from the clear, bright yellow solution.

Yield: 59 parts by weight (93% of theory) of a slightly yellow liquid
$n_D^{20}$: 1,590
Pb, Calculated: 32.3%. Found: 31.6%.

EXAMPLE 19

Triphenyllead-thiophenolate 44 parts by weight of hexaphenyldilead were suspended in 100 parts by weight of acetone. Then a solution of 6.9 parts by weight of a 55% aqueous solution of peracetic acid and 3 parts by weight of glacial acetic acid was added drop by drop at room temperature. Stirring was continued for 10 minutes. Then 11 parts by weight of thiophenol and a solution of 15 parts by weight of sodium carbonate in 20 parts by weight of water were added. The mixture was heated for 30 minutes at reflux and then cooled to 0° C. The reaction product was sucked off and recrystallized from ethanol.

Yield: 49.0 parts by weight (90% of theory) of slightly yellow crystals.
Melting point: 105° C. (Found)
105–106° C.[6]

EXAMPLE 20

Triphenyllead-methane sulfonate (a) A solution of 3.5 parts by weight of a 55% aqueous solution of peracetic acid, 4.8 parts by weight of methane sulfonic acid and 20 parts by weight of water was added drop by drop while stirring to 22 parts by weight of hexaphenyldilead suspended in 100 parts by weight of toluene. The mixture was heated for 1 hour at 70–80° C. and then allowed to cool to 15° C. The precipitated reaction product was sucked off and dried.

Yield: 22 parts by weight (82% of theory) of colorless crystals.
Melting point: >300° C.

Calculated (percent): Pb, 38.84; C, 42.75; H, 3.41.
Found (percent): Pb, 38.4; C, 42.94; H, 3.59.

(b) Replacement of the peracetic acid by perbutyric acid led to a yield of 89% of theory.

EXAMPLE 21

Triphenyllead-amido sulfonate 22 parts by weight of hexaphenyldilead were suspended in 100 parts by weight of toluene and a solution of 3.5 parts by weight of a 55% aqueous solution of peracetic acid and 4.9 parts by weight of amino sulfonic acid was added drop by drop at room temperature while stirring. The mixture was heated for 35 minutes at 70–80° C. and then allowed to cool to 15° C. The precipitated reaction product was sucked off and dried.

Yield: 24 parts by weight (90% of theory) of colorless crystals
Melting point: 240–250° C. (decomposition)

Calculated (percent): Pb, 38.75; C, 40.46; H, 3.21.
Found (percent): Pb, 39.5; C, 40.97; H, 3.18.

EXAMPLE 22

Triphenyllead-p-toluene sulfonate 22 parts by weight of hexaphenyldilead were suspended in 100 parts by weight of toluene and a solution of 3.5 parts by weight of a 55% aqueous solution of peracetic acid and 9.5 parts by weight of p-toluene sulfonic acid was added drop by drop at room temperature while stirring. The mixture was heated for 35 minutes at 70–80° C. and then cooled to 15° C. The precipitated reaction product was sucked off and dried.

Yield: 28 parts by weight (92% of theory)
Melting point: 229° C.

Calculated (percent): Pb, 34.0; C, 49.27; H, 3.65.
Found (percent): Pb, 33.9; C, 48.70; H, 3.48.

---

[6] See footnote 6 supra.

EXAMPLE 23

Triphenyllead-sorbate 22 parts by weight of hexaphenyldilead and 5.6 parts by weight of sorbic acid were suspended in 100 parts by weight of petroleum ether (boiling range: 60–80° C.). 3.5 parts by weight of a 55% aqueous solution of peracetic acid was added drop by drop while stirring. The mixture was heated for 20 minutes at reflux and then cooled to 15° C. The precipitated reaction product was sucked off and dried.

Yield: 27 parts by weight (98% of theory)
Melting point: 172–174° C.

Calculated (percent): Pb, 37.73; C, 52.42; H, 4.03.
Found (percent): Pb, 39.7; C, 52.30; H, 3.97.

EXAMPLE 24

Triphenyllead-imidazolide 22 parts by weight of hexaphenyldilead were suspended in 100 parts by weight of acetone. A solution of 3.9 parts by weight of a 55% aqueous solution of peracetic acid and 1.5 parts by weight of glacial acetic acid was added drop by drop at room temperature while stirring. Stirring was continued for 10 minutes, then 3.4 parts by weight of imidazole and a solution of 3.2 parts by weight of sodium carbonate in 10 parts by weight of water were added. The mixture was heated for 1 hour at reflux and then cooled to 20° C. The reaction product was sucked off and dried.

Yield: 24.6 parts by weight (97% of theory)
Melting point: 266–268° C. (decomposition)[6] (Found) 285° C. (decomposition).

EXAMPLE 25

Triphenyllead-1,2,3-benztriazolide

With the same method of operation as used in Example 24, 5.6 parts by weight of 1,2,3-benztriazole were used instead of the imidazole.

Yield: 25 parts by weight (90% of theory)
Melting point: 270° C. (decomposition) (Found) 276° C. (decomposition).[6]

EXAMPLE 26

Triphenyllead-3-amino-1,2,4-triazolide

With the same method of operation as used in Example 24, 4 parts by weight of 3-amino-1,2,4-triazole were used instead of the imidazole.

Yield: 20.5 parts by weight (79% of theory)
Melting point: 230° C. (decomposition) (Found) 248–256° C. (decomposition).[6]

EXAMPLE 27

(a) 87.6 parts by weight of hexaphenyldilead were suspended in 250 parts by weight of methylene chloride and 250 parts by weight of water. The mixture was mixed drop by drop at room temperature with 7.6 parts by weight of peracetic acid in 60 parts by weight of glacial acetic acid. After that, the mixture was stirred for 15 minutes at this temperature and then cooled to 0° C. The precipitated crystals were sucked off and dried.

Yield: 68 parts by weight of triphenyllead acetate. Through concentration of the mother liquor, an additional 19 parts by weight of triphenyllead acetate were obtained.

Total yield: 87 parts by weight (88% of the theory)
Melting point: 206–207° C. (Found), 204–206° C.

(b) When tetrahydrofurane was used instead of methylene chloride and water as a solvent, according to the procedure given under (a) above, 88 parts by weight (89% of theory) of triphenyllead acetate was obtained.

(c) When the solvent mixture of methylene chloride-water in the procedure presented under (a) above was

---

[6] Supra.

replaced by acetone, there was obtained 83 parts by weight of triphenyllead acetate, which corresponds to a yield of 84% of theory. Through concentration of the mother liquor, an additional amount can be obtained.

EXAMPLE 28

8.8 parts by weight of hexaphenyldilead were suspended in 25 parts by weight of petroleum ether (boiling range: 60–80° C.) and reacted drop by drop with a solution of 1.4 parts by weight of perbenzoic acid in 10 parts by weight of diethyl ether at room temperature. The perbenzoic acid solution contained an excess of benzoic acid in the ratio of 1:5. The mixture was stirred for 30 more minutes at 30° C. and then cooled to 0° C. The precipitated crystals were filtered and dried.

Crude yield: 9.7 parts by weight (87% of theory) of triphenyllead benzoate. After recrystallization from isopropanol, the melting point was 122° C.
(Literature melting point: 122–124° C.).

EXAMPLE 29

8.8 parts by weight of hexaphenyldilead were dissolved in 25 parts by weight of methylene chloride. 2.8 parts by weight of a mixture of caprylic and percaprylic acid in a mole ratio of 1:1 were added drop by drop at 10–15° C. and the solution was stirred for 30 minutes at 20° C. Subsequently, the solvent was boiled off under decreased pressure and the residue was recrystallized using 200 parts by weight of isopropanol.

Yield: 8.6 parts by weight (74% of theory) of triphenyllead caprylate. A further part of triphenyllead caprylate was obtained through concentration of the mother liquor.
Melting point: 135–136° C.
Pb determination: Calculated: 35.6%. Found: 35.9%.

EXAMPLE 30

8.8 parts by weight of hexaphenyldilead were suspended in a mixture of 25 parts by weight of chloroform and 30 parts by weight of ethanol and reacted with 1.6 parts by weight of phthalic acid. Subsequently, 1.8 parts by weight of monoperphthalic acid in 40 parts by weight of diethyl ether were added drop by drop. This was heated for 10 minutes to 40° C. and the precipitated crystals were sucked off after cooling.

Yield: 11.2 parts by weight (93% of theory) of triphenyllead monophthalate.
Decomposition point: 320° C.
Pb determination: Calculated: 34.4%. Found: 34.3%.

EXAMPLE 31

2.6 parts by weight of perlauric acid and 2.4 parts by weight of lauric acid, dissolved in 10 parts by weight of methylene chloride, were added drop by drop to 17.6 parts by weight of hexaphenyldilead dissolved in 50 parts by weight of methylene chloride. The mixture was stirred for 20 minutes and was boiled down under decreased pressure to a dry substance. The residue was recrystallized from isopropanol.

Yield: 21.7 parts by weight (85% of theory) of triphenyllead laurate.
Melting point: 114–116° C.
(Literature melting point: 115–117° C.).

EXAMPLE 32

8.8 parts by weight of hexaphenyldilead were suspended in 30 parts by weight of toluene and were reacted with 1.2 parts by weight of maleic acid. Subsequently, 1.3 parts by weight of permaleic acid, dissolved in 10 parts by weight of methylene chloride, were added drop by drop. The mixture was stirred for 30 minutes at room temperature and, after cooling, the precipitated crystals were sucked off.

Yield: 8.5 parts by weight (77% of theory) of triphenyllead maleinate
Melting point: 204° C.
(Literature melting point: 201–203° C.).

EXAMPLE 33

1.5 parts by weight of peracetic acid in the form of a 50% aqueous solution and 0.6 part by weight of glacial acetic acid drop by drop were added to 9.6 parts by weight of hexa-p-tolyldilead, suspended in 25 parts by weight of toluene. The mixture was stirred for 30 minutes subsequently at room temperature. The reaction mixture was boiled down to a dry substance under decreased pressure and was recrystallized from petroleum ether.

Yield: 7.7 parts by weight (72% of theory) of tri-p-tolyllead acetate
Melting point: 159–160° C.
(Literature melting point: 161–162° C.).

EXAMPLE 34

96 parts by weight of hexa-p-tolyldilead were dissolved in 250 parts by weight of methylene chloride and were reacted drop by drop with a mixture of 17 parts by weight of per-2-ethylhexanoic acid and 16 parts by weight of 2 - ethylhexanoic acid. The mixture was subsequently stirred for 10 minutes at room temperature. Then the reaction mixture was boiled down to a dry substance under decreased pressure. The raw product was recrystallized from a mixture of ethanol and water.

Yield: 8.0 parts by weight (63% of theory) of tri-p-tolyllead-2-ethylhexanoate
Melting point: 102° C.
Pb determination: Calculated: 32.5%. Found: 32.0%.

EXAMPLE 35

169 parts by weight of hexabutyldilead were dissolved in 300 parts by weight of methylene chloride and reacted drop by drop at room temperature with 16.7 parts by weight of peracetic acid in 130 parts by weight of glacial acetic acid. The mixture was stirred subsequently for 1 hour and then the methylene chloride phase was separated. The methylene chloride was distilled off and the residue was brought to crystallization through cooling in 400 parts by weight of acetone.

Yield: 135 parts by weight (71% of theory) of tributyllead acetate.

After concentration, an additional fraction was obtained from the mother liquor.

Melting point: 83–84° C.
(Literature melting point: 86° C.).

EXAMPLE 36

While stirring, a solution of 1.5 parts by weight of a 50% aqueous solution of peracetic acid and 1.6 parts by weight of trichloroacetic acid in 10 parts by weight of water were added drop by drop at room temperature to a suspension of 8.8 parts by weight of hexaphenyldilead in 30 parts by weight of toluene. Then, the mixture was stirred subsequently for 30 minutes and, after cooling, the reaction product was sucked off.

Yield: 9.0 parts by weight (82% of theory) of triphenyllead acetate-triphenyllead trichloroacetate
Pb contents: Calculated: 37.8%. Found: 37.4%.

EXAMPLE 37

The same method of operation as in Example 10 was carried out using 1.1 parts by weight of trifluoroacetic acid instead of trichloroacetic acid.

Yield: 8.7 parts by weight (82% of theory) triphenyllead acetate-triphenyllead trifluoroacetate
Pb contents: Calculated: 39.5%. Found: 40.2%.

EXAMPLE 38

The same method of operation as in Example 10 was carried out using 4.6 parts by weight of hexafluorosilicic acid as a 31% aqueous solution instead of trichloroacetic acid.

Yield: 9.5 parts by weight (88% of theory) of triphenyllead acetate-triphenyllead hexafluoro silicate.
Pb contents: Calculated: 38.3%. Found: 39.2%.

EXAMPLE 39

The same method of operation as in Example 10 was carried out using 1.7 parts by weight of p-toluene sulfonic acid instead of trichloroacetic acid.

Yield: 10.9 parts by weight (97% of theory) of triphenyllead acetate-triphenyllead-p-toluene sulfonate.
Pb contents: Calculated: 37.8%. Found: 37.8%.

EXAMPLE 40

8.8 parts by weight of hexaphenyldilead were added to a solution of 2.6 parts by weight of pentachlorophenol in 25 parts by weight of toluene. To this suspension, 1.5 parts by weight of peracetic acid as a 50% aqueous solution were added drop by drop at room temperature. The mixture was subsequently stirred for 2 hours, and after cooling the reaction mixture was sucked off.

Yield: 10.9 parts by weight (91% by theory) of triphenyllead acetate-triphenyllead pentachlorophenolate.
Pb contents: Calculated: 34.2%. Found: 33.5%.

EXAMPLE 41

The new compound, bis(tri-n-butyllead) sulfate, can be produced by a process analogous to that described by P. Pfeiffer, P. Truskier and P. Disselkamp in "Reports of the German Chemical Society" 49, (1916), p. 2446, in the following manner.

An etheral solution of tributyllead bromide (produced from 0.75 mole of lead dichloride according to L. C. Willemsens and G. J. M. van der Kerk, "Investigations in the Field of Organolead Chemistry," Schopanus & Jens Publishers, Utrecht, N. V., The Netherlands, 1965, p. 108) was treated with silver oxide (produced from 100 g. silver nitrate). The reaction mixture was filtered and was mixed with diluted sulfuric acid to an acid pH. The precipitate was filtered off and recrystallized from chloroform.

The bis-(tri-n-butyllead) sulfate produced as a colorless crystalline powder which melts between 225 and 230° C. while decomposing.

*Analysis.*—Calculated for $C_{24}H_{54}O_4Pb_2S$ (853.18) percent): C, 33.78; H, 6.38; Pb, 48.6; S, 3.50. Found (percent): C, 34.25; H, 6.44; Pb, 47.8; S, 3.76.

The bis-(tri-n-butyllead) sulfate has a high degree of chemical stability which far surpasses that of the tri-n-butyllead acetate and particularly that of the tri-n-butyllead chloride. Furthermore, the new compound is quite considerably less soluble in organic solvents than the known salts of the tri-n-butyllead.

The following table permits a comparison of the solubilities of the bis-(tri-n-butyllead) sulfate of the tri-n-butyllead acetate as well as of the tri-n-butyllead chloride.

TABLE

| Formula | Solubility (g./l.) (25° C.) | | | | Melting point (° C.) |
| --- | --- | --- | --- | --- | --- |
| | Ethanol | Acetone | Chloroform | Benzene | |
| $(Bu_3Pb)_2SO_4$ | 125 | 3.6 | 20 | 1.9 | [1] 225–230 |
| $Bu_3PbOOCCH_3$ | 800 | 90 | 440 | 800 | 86 |
| $Bu_3Pb\cdot Cl$ | 540 | 600 | 170 | 90 | 113 |

[1] Decomposition.

What is claimed is:

1. In the process for the production of triorgano-lead compounds of the formula $$[R_3Pb]_nX$$

wherein $n$ is an integer of 1 to 2 and R is selected from the class consisting of (1) phenyl and naphthyl radicals, unsubstituted and substituted with substituents selected from the class consisting of alkyl and alkoxy radicals having 1 to 6 carbon atoms, fluorine and chlorine; (2) linear or branched alkyl radicals having 1 to 12 carbon atoms, cycloalkyl radicals having 3 to 12 carbon atoms and aralkyl radicals having 7 to 18 carbon atoms, and X is selected from the class consisting of an anion of an organic acid, the radical of an organic amine remaining after removal of the nitrogen-bonded hydrogen, the radical of an organic mercaptan remaining after removal of the sulfur-bonded hydrogen, hydroxyl and cyano, from the corresponding hexorganodilead compound $R_3Pb$—$PbR_3$, that improvement comprising, reacting said hexaorganodilead compound with a percarboxylic acid and a compound of the formula $R°_nX_m$ wherein $R°$ is selected from the class consisting of hydrogen, alkali metal and alkaline earth metal, $m$ is an integer of 1 to 2 and X and $n$ are as defined above, in an acid environment using about one mole of percarboxylic acid and about one to about two moles of $R°_nX_m$ per mole of hexaorganodilead compound.

2. Process as claimed in claim 1, wherein the $R°_nX_m$ compound is not inert to the percarboxylic acid used, characterized in that said hexaorganodilead compound is first converted by reaction with said percarboxylic acid and about two moles of an organic carboxylic acid per mole of said hexaorganodilead compound to form a triorganolead acylate and then said triorganolead acylate without isolation is reacted with said $R°_nX_m$ compound.

3. Process as claimed in claim 1, wherein the $R°_nX_m$ compound is unstable or unreactive or the triorganolead product is unstable in an acid medium, characterized in that said hexaorganodilead compound is first converted into triorganolead acrylate by reaction with said percarboxylic acid and about two moles of an organic carboxylic acid per mole of hexaorganolead compound, and subsequently the reaction mixture is treated with sodium carbonate and reacted with said $R°_nX_m$ compound.

4. Process as claimed in claim 2 for the production of the triorganolead hydroxides, characterized in that said triorganolead acylate is reacted with a member of the class consisting of sodium, potassium or calcium hydroxides.

5. Process as claimed in claim 1 wherein said percarboxylic acid is peracetic acid.

6. Process as claimed in claim 1 characterized in that the hexaorganodilead compound is dissolved in a solvent.

7. Process as claimed in claim 6 characterized in that a mixture of said percarboxylic acid and the $R°_nX_m$ compound are added to said hexaorganodilead compound while stirring and cooling, and subsequently the reaction mixture is heated.

8. Process as claimed in claim 1 wherein said percarboxylic acid is added to said hexaorganodilead compound while stirring and cooling, and subsequently the reaction mixture is heated.

9. Process as claimed in claim 1 wherein said $R°_nX_m$ compound is an acid selected from the class consisting of organic acids and inorganic acids and is reacted in the amount of about one mole per mole of hexaorganodilead compound.

10. Process as claimed in claim 9, characterized in that the $R°_nX_m$ compound is the carboxylic acid corresponding to said percarboxylic acid.

11. Process as claimed in claim 9, characterized in that the $R°_nX_m$ compound is a mineral acid.

12. Process as claimed in claim 9, characterized in that the $R°_nX_m$ compound is an organic sulfonic acid.

13. Process as claimed in claim 9, characterized in that the $R°_nX_m$ compound is a phenol.

14. Process as claimed in claim 9, characterized in that the percarboxylic acid and the $R°_nX_m$ compound are brought together at the same time with the hexaorganodilead compound.

15. Process as claimed in claim 9, characterized in that the reaction is carried out in a solvent in which the triorganolead product is precipitated.

16. Process as claimed in claim 9, characterized by the use of a two-phase solvent system, in which one phase has a greater dissolving capacity for the hexaorganodilead compound and percarboxylic acid than for the $R°_nX_m$ compound.

17. Chemical compound from the class consisting of bis-(triphenyllead) hexafluoro silicate, triphenyllead tetrafluoroborate, bis-(triphenyllead) sulfate, triphenyllead sorbate, triphenyllead methane sulfonate, triphenyllead-p-toluene sulfonate, triphenyllead amidosulfonate, tribtuyllead amidosulfonate, triphenyllead hexylmercaptide, triphenyllead laurylmercaptide, triphenyllead thioglycol acid-i-octylester, triphenyllead thiopropionic acid-i-octylester, triphenyllead diethyldithiocarbamate, triphenyllead caprylate, triphenyllead monophthalate, and tri-p-tolyllead-2-ethyl hexoate.

18. Mixtures of compounds of the formula

$R_3Pb$ acetate and $RPbX$ in which R is selected from the class consisting of (1) phenyl and naphthyl radicals, unsubstituted and substituted with substituents selected from the class consisting of alkyl and alkoxy radicals having 1 to 6 carbon atoms, fluorine and chlorine; (2) linear or branched alkyl radicals having 1 to 12 carbon atoms, cycloalkyl radicals having 3 to 12 carbon atoms and aralkyl radicals having 7 to 18 carbon atoms, and X is selected from the class consisting of an anion of an organic and inorganic acid.

19. Mixtures selected from the class consisting of triphenyllead acetate/triphenyllead trichloro acetate, triphenyllead acetate/triphenyllead trifluoro acetate, triphenyllead acetate/triphenyllead pentachlorophenolate, triphenyllead acetate/triphenyllead dinitrophenolate, triphenyllead acetate/triphenyllead hexafluoro silicate, triphenyllead acetate/triphenyllead toluene sulfonate, tributyllead acetate/tributyllead trichloro acetate, tributyllead acetate/tributyllead trifluoro acetate, tributyllead acetate/tributyllead hexafluoro silicate, and tributyllead acetate/tributyllead toluene sulfonate.

20. A compound having the formula

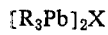

$[R_3Pb]_2X$ wherein (A) R is selected from the class consisting of (1) phenyl and naphthyl radicals, unsubstituted and substituted with substituents selected from the group consisting of alkyl and alkoxy radicals having 1 to 6 carbon atoms, fluorine and chlorine; (2) linear or branched alkyl radicals having 1 to 12 carbon atoms, cycloalkyl radicals having 3 to 12 carbon atoms and aralkyl radicals having 7 to 18 carbon atoms, when X is selected from the class consisting of the radical of an organic diamine after removal of two nitrogen-bonded hydrogens, and the radical of an organic dimercaptan remaining after removal of two sulfur bonded hydrogens and (B) is selected from the class consisting of (1) unsubstituted naphthyl, and phenyl and naphthyl radicals substituted with substituents selected from the group consisting of alkyl and alkoxy radicals having 1 to 6 carbon atoms, fluorine and chlorine; (2) cycloalkyl radicals having 3 to 12 carbon atoms and aralkyl radicals having 7 to 18 carbon atoms, when X is selected from the class consisting of a divalent anion of an aromatic hydrocarbon carboxylic acid having 8 to 18 carbon atoms, sulfuric acid and hexafluorosilicic acid, the radical of an organic diamine after removal of two nitrogen-bonded hydrogens, and the radical of an organic dimercaptan remaining after removal of two sulfur-bonded hydrogen.

References Cited

UNITED STATES PATENTS 3,055,925   9/1962   Hartle _____ 260—437

OTHER REFERENCES

Shapiro et al., The Organic Compounds of Lead, Interscience Publishers, John Wiley & Sons, New York, p. 262 (1968).

Chemical Reviews, vol. 54, p. 146 (1954).

TOBIAS E. LEVOW, Primary Examiner

H. M. S. SNEED, Assistant Examiner

U.S. Cl. X.R.

252—380, 431; 260—242, 299, 414, 436, 999